(12) United States Patent
Shimamoto et al.

(10) Patent No.: US 11,198,405 B2
(45) Date of Patent: *Dec. 14, 2021

(54) IN-VEHICLE BACKUP CIRCUIT AND IN-VEHICLE BACKUP DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kazushi Shimamoto, Yokkaichi (JP); Yuuki Sugisawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/050,748

(22) PCT Filed: Apr. 9, 2019

(86) PCT No.: PCT/JP2019/015455
§ 371 (c)(1),
(2) Date: Oct. 26, 2020

(87) PCT Pub. No.: WO2019/208203
PCT Pub. Date: Oct. 31, 2019

(65) Prior Publication Data
US 2021/0229610 A1 Jul. 29, 2021

(30) Foreign Application Priority Data
Apr. 27, 2018 (JP) .............................. JP2018-086117

(51) Int. Cl.
*B60R 16/033* (2006.01)
*H02J 7/00* (2006.01)
(Continued)

(52) U.S. Cl.
CPC .......... *B60R 16/033* (2013.01); *H02J 7/0063* (2013.01); *H02J 9/06* (2013.01); *H02J 7/345* (2013.01)

(58) Field of Classification Search
CPC .......... B60R 16/033; H02J 7/0063; H02J 9/06
(Continued)

(56) References Cited

U.S. PATENT DOCUMENTS 8,044,536 B2 * 10/2011 Nguyen .................... H02J 1/08
307/82
9,013,056 B2 4/2015 Kageyama et al.
(Continued)

FOREIGN PATENT DOCUMENTS

| | | |
|---|---|---|
| JP | 2003-244937 A | 8/2003 |
| JP | 2014-231327 A | 12/2014 |

(Continued)

OTHER PUBLICATIONS

International Search Report, Application No. PCT/JP2019/015455, dated Jun. 18, 2019. ISA/Japan Patent Office.

*Primary Examiner* — Michael R. Fin
(74) *Attorney, Agent, or Firm* — Honigman LLP (57) ABSTRACT

A configuration with which, even if the supply of power from a power supply portion ceases, the power from another power supply source can be instantly supplied to a power supply target is more easily achieved. In a backup circuit, a control unit causes a second voltage conversion portion to perform a voltage conversion operation in response to satisfaction of a predetermined first backup condition, and a power supply portion-side conductive path and an electricity (Continued)

storage portion-side conductive path are electrically connected to each other via a resistive portion when the control unit is causing the second voltage conversion portion to perform the voltage conversion operation. Furthermore, the control unit causes the first voltage conversion portion to perform a second operation in response to a predetermined second backup condition being satisfied when the control unit is causing the second voltage conversion portion to perform the voltage conversion operation.

16 Claims, 4 Drawing Sheets

(51) Int. Cl.
    *H02J 9/06*         (2006.01)
    *H02J 7/34*         (2006.01)

(58) Field of Classification Search
    USPC .................................... 307/9.1, 10.1, 64, 82
    See application file for complete search history.

(56)                 References Cited

U.S. PATENT DOCUMENTS

2020/0244098 A1*   7/2020   Liu ...................... H02M 3/156
2021/0109133 A1*   4/2021   Shimamoto ........... B60L 3/0046

FOREIGN PATENT DOCUMENTS

| JP | 2015-80372 A | 4/2015 |
|----|--------------|--------|
| JP | 2017-154579 A | 9/2017 |

\* cited by examiner

IN-VEHICLE BACKUP CIRCUIT AND IN-VEHICLE BACKUP DEVICE

CROSS-REFERENCE TO RELATED APPLICATIONS

This application is the U.S. national stage of PCT/JP2019/015455 filed on Apr. 9, 2019, which claims priority of Japanese Patent Application No. JP 2018-086117 filed on Apr. 27, 2018, the contents of which are incorporated herein.

TECHNICAL FIELD

The present disclosure relates to an in-vehicle backup circuit and an in-vehicle backup device.

BACKGROUND

It is widely known that in-vehicle power supply systems using a battery or the like as a main power supply are provided with an auxiliary power supply so as to be able to maintain the supply of power even if a failure or the like occurs in the main power supply. In general, a system of this type is configured to detect the state of the main power supply if the supply of power therefrom ceases, and to switch the supply of power to be performed from the auxiliary power supply, thus maintaining the supply of power to a load by the auxiliary power supply. However, if no measures are taken, there is a problem in that the supply of power is interrupted until the supply of power by the auxiliary power supply is started after the supply of power from the main power supply has ceased.

As a technique for solving this problem, the technique as disclosed in Japanese Patent No. 5618024 is proposed. The technique disclosed in Japanese Patent No. 5618024 allows a smoothing capacitor to supply power to a load during a time-lag period until the output voltage of the EDLC is stepped up and supplied to the load after the battery has failed.

However, the system disclosed in Japanese Patent No. 5618024 requires a smoothing capacitor having a larger capacity when the power consumption of the load, which is the target of power supply, is large, and it is therefore necessary to provide a plurality of smoothing capacitors, or to provide a larger smoothing capacitor. Accordingly, using the system disclosed in Japanese Patent No. 5618024 alone tends to result in an increase in the circuit scale when the power consumption of the load is large, and this problem becomes more prominent as the power consumption increases.

The present disclosure has been made in order to solve at least one of the above-described problems, and an object of the disclosure is to more easily achieve a configuration with which, even if the supply of power from a power supply portion ceases, the power from another power supply source can be instantly supplied to a power supply target.

SUMMARY

An in-vehicle backup circuit according to a first aspect of the present disclosure is an in-vehicle backup circuit for use in an in-vehicle power supply system including a power supply portion-side conductive path serving as a path to which power is supplied from a power supply portion; and a first load-side conductive path serving as a path for supplying power to a first power supply target. A second load-side conductive path serves as a path for supplying power to a second power supply target; and an electricity storage portion serves as a power supply source different from the power supply portion, wherein, when supply of power performed from the power supply portion via the power supply portion-side conductive path is in a predetermined normal state, power is supplied to the first power supply target from the power supply portion via the power supply portion-side conductive path and the first load-side conductive path, and power is supplied to the second power supply target from the power supply portion via the power supply portion-side conductive path and the second load-side conductive path. The in-vehicle backup circuit includes an electricity storage portion-side conductive path electrically connected to the electricity storage portion; and a predetermined intermediate conductive path. A first voltage conversion portion is configured to perform a first operation of stepping down or stepping up a voltage applied to the power supply portion-side conductive path to apply an output voltage to the electricity storage portion-side conductive path, and a second operation of stepping down or stepping up a voltage applied to the electricity storage portion-side conductive path to apply an output voltage to the power supply portion-side conductive path. A resistive portion is provided in parallel with the first voltage conversion portion between the power supply portion-side conductive path and the electricity storage portion-side conductive path. A second voltage conversion portion is configured to perform a voltage conversion operation of stepping up or stepping down a voltage applied to the electricity storage portion-side conductive path to apply an output voltage to the intermediate conductive path. An element portion is provided between the intermediate conductive path and the second load-side conductive path, and is configured to allow flow of current from the intermediate conductive path to the second load-side conductive path when the backup circuit is in a first state in which a potential of the intermediate conductive path is higher than a potential of the second load-side conductive path by a predetermined potential difference or more, and to limit flow of current from the intermediate conductive path to the second load-side conductive path when the backup circuit is in a second state in which the first state has been cancelled. A control unit is configured to control operations of the first voltage conversion portion and the second voltage conversion portion, wherein the control unit is configured to: cause the first voltage conversion portion to start the first operation in response to satisfaction of a predetermined charge start condition, and to stop the first operation in response to a predetermined charge stop condition having been satisfied during the first operation; cause the second voltage conversion portion to perform the voltage conversion operation in response to satisfaction of a predetermined first backup condition; and cause the first voltage conversion portion to perform the second operation in response to a predetermined second backup condition having been satisfied when the control unit is causing the second voltage conversion portion to perform the voltage conversion operation, and the power supply portion-side conductive path and the electricity storage portion-side conductive path are configured to be electrically connected via the resistive portion when the control unit is causing the second voltage conversion portion to perform the voltage conversion operation.

An in-vehicle backup device according to a second aspect of the present disclosure includes the above-described in-vehicle backup circuit and the above-described electricity storage portion.

Advantageous Effects of Disclosure

In the in-vehicle power supply system to which the in-vehicle backup circuit according to the first aspect is applied, the power from the power supply portion is supplied to the first power supply target and the second power supply target when the supply of power performed from the power supply portion via the power supply portion-side conductive path is in a predetermined normal state.

On the other hand, even if the supply of power from the power supply portion ceases for some reason, power can be instantly supplied from the intermediate conductive path to the second load-side conductive path based on the supply of power from the electricity storage portion as long as the second voltage conversion portion is performing the voltage conversion operation in the backup circuit, and it is therefore possible to instantly backup the second load-side conductive path.

Moreover, the above-described backup circuit can quickly charge the electricity storage portion by the first operation of the first voltage conversion portion during a predetermined period, and the power supply portion-side conductive path and the electricity storage portion-side conductive path are configured to be electrically connected to each other via the resistive portion when the second voltage conversion portion is performing the voltage conversion operation. Accordingly, even if internal consumption or self discharge occurs, charge current can be supplied to the electricity storage portion via the resistive portion, thus making it possible to suppress a reduction in the charge voltage of the electricity storage portion. Therefore, the charge voltage of the electricity storage portion can be maintained at a higher level when the second voltage conversion portion is performing the voltage conversion operation, thus making it easier to avoid a situation where the charge voltage of the electricity storage portion becomes insufficient when the supply of power from the power supply portion ceases.

Furthermore, the first voltage conversion portion can be caused to perform the second operation if a predetermined second backup condition is satisfied when the control unit is causing the second voltage conversion portion to perform the voltage conversion operation, and it is possible to supply the power based on the supply of power from the electricity storage portion also to the first power supply target. That is, when the supply of power of the power supply portion ceases, it is possible to perform a backup operation in a manner in which the order of priority is defined so as to instantly supply power to the second power supply target, and to supply power to the first power supply target in response to the satisfaction of the second backup condition.

With the in-vehicle backup device according to the second aspect, it is possible to achieve the same effects as those achieved by the in-vehicle backup circuit according to the first aspect.

DETAILED DESCRIPTION OF PREFERRED EMBODIMENTS

Here, preferable examples of the present disclosure will be described. Note, however, that the present disclosure is not limited to the following examples.

The backup circuit may be configured to be brought into the second state if a predetermined voltage is applied to the intermediate conductive path when the power supply portion is in a fully charged state and is in the normal state. Also, the control unit may be configured to cause the second voltage conversion portion to perform the voltage conversion operation so as to apply the predetermined voltage to the intermediate conductive path.

In the backup circuit configured in this manner, current does not flow from the intermediate conductive path to the second load-side conductive path even if the second voltage conversion portion performs the voltage conversion operation when the power supply portion is in a fully charged state, and it is therefore possible to suppress power consumption during the voltage conversion operation performed by the second voltage conversion portion. Also, while continuing preparation with the power consumption suppressed in this manner, it is possible to instantly supply power to the intermediate conductive path when the supply of power from the power supply portion ceases.

The backup circuit may include a first diode having an anode electrically connected to the power supply portion-side conductive path and the first load-side conductive path, and a cathode electrically connected to the second load-side conductive path, and a second diode having an anode electrically connected to the intermediate conductive path, and a cathode electrically connected to the second load-side conductive path. Also, the second diode may be configured as the element portion.

In the backup circuit configured in this manner, current is instantly supplied from the second diode if the voltage of the second load-side conductive path has changed from a state of being higher than a given value (a value obtained by subtracting an amount of voltage dropped in the second diode from a predetermined voltage targeted by the second voltage conversion portion) to a state of being lower than the given value, thus enabling a backup operation with a higher degree of seamlessness to be performed with a simple configuration.

Furthermore, since the first diode is interposed between the second load-side conductive path and the power supply portion-side conductive path, it is possible to prevent current from flowing from the second load-side conductive path into the power supply portion-side conductive path if the voltage of the power supply portion-side conductive path has rapidly decreased as a result of occurrence of a ground fault or the like in the power supply portion-side conductive path, thus preventing the voltage of the second load-side conductive path from decreasing during a backup performed via the second diode. Accordingly, the second power supply target can be backed up further stably.

The second voltage conversion portion may be a voltage conversion portion having a smaller power capacity than the first voltage conversion portion.

The backup circuit configured in this manner can pass a larger charge current by the first voltage conversion portion, which has a large power capacity, when charging the electricity storage portion by the first voltage conversion portion, thereby quickly increasing the charge voltage, and can efficiently perform preparation by continuing the operation of the second voltage conversion portion, which has a relatively low power capacity, when preparing for a power supply failure by operating the second voltage conversion portion.

The second power supply target may be configured to output predetermined instruction information if supply of power to the first power supply target has been brought into a stopped state. Also, the control unit may function so as to cause the first voltage conversion portion to perform the second operation, using, as the second backup condition, acquisition of the instruction information from the second power supply target when the control unit is causing the second voltage conversion portion to perform the voltage conversion operation.

In an in-vehicle power supply system to which this backup circuit is applied, the supply of power to the first power supply target is brought into a stopped state when the supply of power from the power supply portion ceases, and thus the second power supply target is operated so as to output predetermined instruction information according to this stopped state. Based on such a system, the control unit causes the first voltage conversion portion to perform the second operation in response to the acquisition of the instruction information from the second power supply target when the control unit is causing the second voltage conversion portion to perform the voltage conversion operation. Accordingly, it is possible to promptly detect the state of the power supply portion if the supply of power therefrom ceases, and supply the power based on the supply of power from the electricity storage portion to the first power supply target.

Moreover, even if the supply of power from the power supply portion ceases, a backup operation with a higher degree of seamlessness can be instantly performed on the second power supply target. Accordingly, it is possible to prevent a situation where a lack of power to the second power supply target makes it impossible to detect "that the supply of power to the first power supply target has been brought into a stopped state", and therefore a trigger for starting the second operation can be more reliably provided to the control unit. Thus, even if the supply of power from the power supply portion ceases, the supply of power using the first voltage conversion portion can be more easily started for the first power supply target more promptly and more reliably.

Embodiment 1

Hereinafter, Embodiment 1 of the present disclosure will be described.

Figure 1:
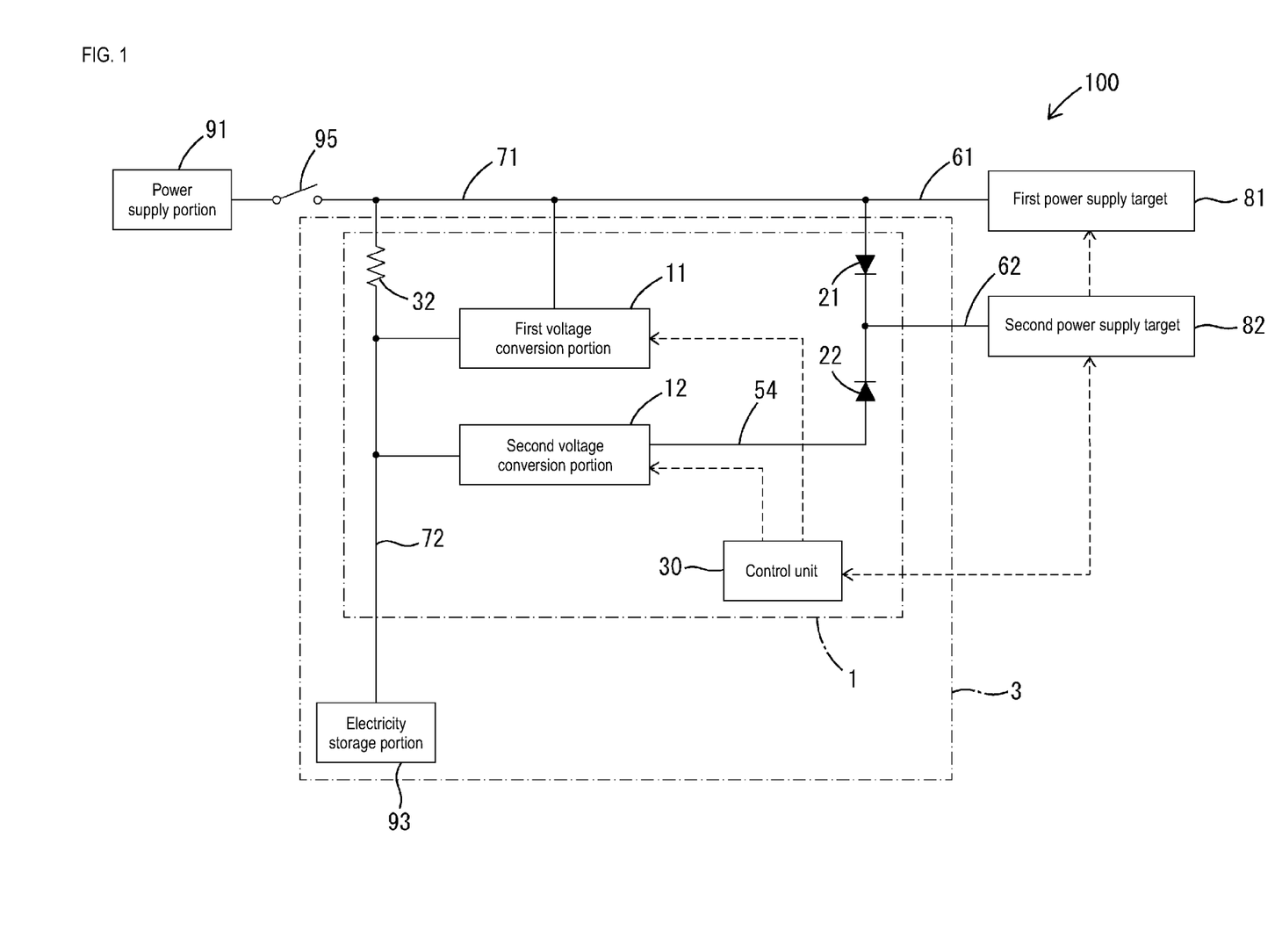
FIG. 1 is a block diagram illustrating a configuration of an in-vehicle power supply system including an in-vehicle backup circuit according to Embodiment 1.

An in-vehicle backup circuit 1 (hereinafter also referred to as "backup circuit 1") of Embodiment 1 constitutes a part of an in-vehicle power supply system 100 (hereinafter also referred to as "power supply system 100") shown in FIG. 1. The in-vehicle power supply system 100 includes a power supply portion 91, an electricity storage portion 93, a power supply portion-side conductive path 71, an electricity storage portion-side conductive path 72, a first load-side conductive path 61, a second load-side conductive path 62, the backup circuit 1, and so forth. The backup circuit 1 and the electricity storage portion 93 constitute an in-vehicle backup device 3 (hereinafter also referred to as "backup device 3").

The power supply system 100 is configured as a system capable of supplying power to a first power supply target 81 and a second power supply target 82, using the power supply portion 91 or the electricity storage portion 93 as a power supply source. The backup circuit 1 is configured such that, when the supply of power performed from the power supply portion 91 via the power supply portion-side conductive path 71 is in a predetermined normal state, power is supplied to the first power supply target 81 from the power supply portion 91 via the power supply portion-side conductive path 71 and the first load-side conductive path 61, and power is supplied to the second power supply target 82 from the power supply portion 91 via the power supply portion-side conductive path 71 and the second load-side conductive path 62.

Note that in the following description "when the supply of power performed from the power supply portion 91 via the power supply portion-side conductive path 71 is in a predetermined normal state" is defined as "if the output voltage of the power supply portion 91 is greater than or equal to a predetermined threshold, and the voltage applied to the power supply portion-side conductive path 71 based on the supply of power from the power supply portion 91 is greater than or equal to the predetermined threshold". Specifically, the above-described "predetermined threshold" is a value higher than the "predetermined voltage" described below that is output by the second voltage conversion portion 12.

The power supply portion 91 is a portion serving as a main power supply for supplying power to the first power supply target 81 and the second power supply target 82, and is configured as, for example, a known in-vehicle battery such as a lead-acid battery. The power supply portion 91 has a high potential-side terminal electrically connected to the power supply portion-side conductive path 71, and a low potential-side terminal electrically connected to a ground portion (not shown), and applies a predetermined output voltage (hereinafter also referred to as "+B voltage") to the power supply portion-side conductive path 71.

The electricity storage portion 93 is configured as a power supply source that is different from the power supply portion 91, and is a portion serving as a power supply when the supply of power from at least the power supply portion 91 ceases. The electricity storage portion 93 has a high potential-side terminal electrically connected to the electricity storage portion-side conductive path 72, and a low potential-side terminal electrically connected to a ground portion (not shown), and applies a predetermined output voltage to the electricity storage portion-side conductive path 72. The electricity storage portion 93 is configured by, for example, known electricity storage means such as an electric double layer capacitor (EDLC). Note that the voltage of the electricity storage portion 93 in the fully charged state has a value smaller than that of the voltage of the power supply portion 91 in the fully charged state.

The power supply portion-side conductive path 71 is a wiring portion electrically connected to the power supply portion 91, and serves as a path to which power is supplied from the power supply portion 91. The voltage (output voltage) of the high potential-side terminal of the power supply portion 91 is applied to the power supply portion-side conductive path 71.

The electricity storage portion-side conductive path 72 is a wiring portion electrically connected to the electricity storage portion 93, and serves as a path through which charge current is supplied to the electricity storage portion 93, and also a path to which discharge current from the electricity storage portion 93 is supplied. The voltage (charge voltage) of the high potential-side terminal of the electricity storage portion 93 is applied to the electricity storage portion-side conductive path 72.

The first load-side conductive path 61 is a wiring portion electrically connected to the first power supply target 81, and serves as a path for supplying power to the first power supply target 81.

The second load-side conductive path 62 is a wiring portion electrically connected to the second power supply target 82, and serves as a path for supplying power to the second power supply target 82.

The first power supply target 81 is constituted by one or more in-vehicle loads, and is specifically configured as one or more known in-vehicle electric components. A preferred example of the first power supply target 81 is an electric component that is desired to be supplied with power even when the supply of power from the power supply portion 91 ceases. For example, an electric component (e.g., an in-vehicle actuator such as a motor) that has a lower degree of urgency for backup than the second power supply target 82 may be the first power supply target 81. The first power supply target 81 can be operated based on the power supplied from the power supply portion 91 in the above-described normal state, and can be operated based on the power supplied via a first voltage conversion portion 11, which will be described below, in an abnormal state, which is not the normal state.

The second power supply target 82 is constituted by one or more in-vehicle loads, and is specifically configured as a known in-vehicle electric component. A preferred example of the second power supply target 82 is an electric component that is desired to be supplied with power even when the supply of power from the power supply portion 91 ceases. For example, an electric component (e.g., an ECU or the like in an electronic control system such as a shift-by-wire control system and an electric parking brake system) that has a higher degree of urgency for backup than the first power supply target 81, and that is desired to be backed up such that supply of power is not interrupted may be the second power supply target 82. The second power supply target 82 can be operated based on the power supplied from the power supply portion 91 in the above-described normal state, and can be operated based on the power supplied via a second voltage conversion portion 12, which will be described below, in an abnormal state.

The backup circuit 1 will now be described in detail.

The backup circuit 1 is a portion that constitutes the backup device 3, together with the electricity storage portion 93. The backup circuit 1 is a device that functions to quickly perform discharging from the electricity storage portion 93 when the supply of power from at least the power supply portion 91 ceases. The backup circuit 1 mainly includes an intermediate conductive path 54, a first diode 21, a second diode 22, a first voltage conversion portion 11, a second voltage conversion portion 12, a resistive portion 32, and so forth.

The first voltage conversion portion 11 is configured as, for example, a known step-up/step-down DC-DC converter, and can perform a first operation of stepping down the voltage applied to the power supply portion-side conductive path 71 to apply an output voltage to the electricity storage portion-side conductive path 72, and a second operation of stepping up the voltage applied to the electricity storage portion-side conductive path 72 to apply an output voltage to the power supply portion-side conductive path 71. The first voltage conversion portion 11 is a voltage conversion portion having a larger power capacity than the second voltage conversion portion 12, and is configured to be capable of outputting a larger current than the second voltage conversion portion 12.

The second voltage conversion portion 12 is configured as, for example, a known step-up DC-DC converter, and can perform a voltage conversion operation of stepping up the voltage applied to the electricity storage portion-side conductive path 72 to apply an output voltage to the intermediate conductive path 54. The second voltage conversion portion 12 is a voltage conversion portion having a higher power capacity than the first voltage conversion portion 11.

The intermediate conductive path 54 is a conductive path to which the output voltage of the second voltage conversion portion 12 is applied, and has one end side electrically connected to the second voltage conversion portion 12, and the other end side electrically connected to an anode of the second diode 22.

The resistive portion 32 is configured as, for example, a known resistor, is provided in parallel with the first voltage conversion portion 11 between the power supply portion-side conductive path 71 and the electricity storage portion-side conductive path 72, and serves as a path via which the power that is supplied from the power supply portion 91 not via the first voltage conversion portion 11 can be supplied to the electricity storage portion 93. The resistive portion 32 has one end electrically connected to the power supply portion-side conductive path 71 and the first load-side conductive path 61, and the other end of the resistive portion 32 is electrically connected to the high potential-side terminal of the electricity storage portion 93 via the electricity storage portion-side conductive path 72.

The first diode 21 has an anode electrically connected to the power supply portion-side conductive path 71, and a cathode electrically connected to the second load-side conductive path 62 and the cathode of the second diode 22. The first diode 21 allows flow of current from the power supply portion-side conductive path 71 into the second load-side conductive path 62, and blocks flow of current from the second load-side conductive path 62 into the power supply portion-side conductive path 71. For example, even when an abnormality such as a ground fault occurs in the power supply portion-side conductive path 71, current will not flow from the second load-side conductive path 62 into the power supply portion-side conductive path 71.

The second diode 22 corresponds to an example of the element portion, and has an anode electrically connected to the intermediate conductive path 54, and a cathode electrically connected to the second load-side conductive path 62 and the cathode of the first diode 21. The second diode 22 is provided between the intermediate conductive path 54 and the second load-side conductive path 62, and allows current to flow from the intermediate conductive path 54 to the second load-side conductive path 62 when the backup circuit 1 is in a first state in which the potential of the intermediate conductive path 54 is higher than the potential of the second load-side conductive path 62 by a predetermined potential difference or more (specifically, if the potential of the intermediate conductive path 54 is higher than the potential of the second load-side conductive path 62, and the potential difference is larger than an amount of voltage drop Vf in the second diode 22), and limits current flowing from the intermediate conductive path 54 to the second load-side conductive path 62 when the backup circuit 1 is in a second state in which the first state having been cancelled.

The control unit 30 is a portion that controls the operations of the first voltage conversion portion 11 and the second voltage conversion portion 12. The control unit 30 is configured as, for example, a microcomputer, and includes an arithmetic unit such as a CPU, a memory such as a ROM or a RAM, an AD converter, and the like. The control unit 30 receives power supplied from the power supply portion 91 or the electricity storage portion 93. The control unit 30 is configured to be capable of individually outputting a control signal to each of the first voltage conversion portion 11 and the second voltage conversion portion 12, and can individually control the voltage conversion operations of the first voltage conversion portion 11 and the second voltage conversion portion 12. Furthermore, the control unit 30 can communicate with the second power supply target 82. In addition, the control unit 30 can acquire a value detected by a voltage detector (not shown) for detecting the voltage of the power supply portion-side conductive path 71, also can acquire a value detected by a voltage detector (not shown) for detecting the voltage of the electricity storage portion-side conductive path 72, and also can acquire a value detected by a voltage detector (not shown) for detecting the voltage of the intermediate conductive path 54. That is, the control unit 30 can specify the voltage of each of the power supply portion-side conductive path 71, the electricity storage portion-side conductive path 72, and the intermediate conductive path 54. Note that the control unit 30 may be configured to be capable of specifying the magnitude or direction of each of the currents respectively flowing through the power supply portion-side conductive path 71, the electricity storage portion-side conductive path 72, and the intermediate conductive path 54.

The operation of the backup circuit 1 will now be described.

Figure 2:
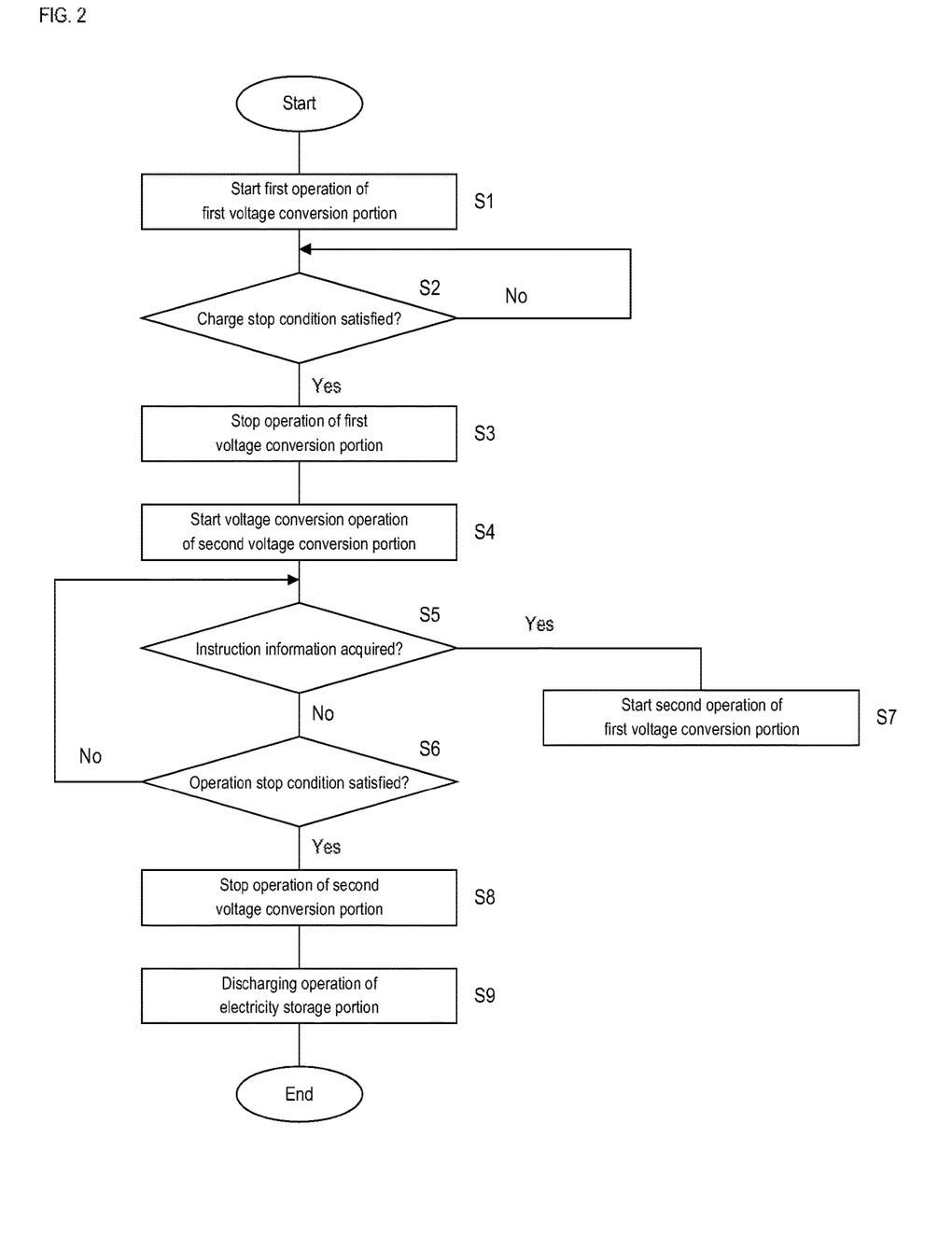
FIG. 2 is a flowchart illustrating a flow of a backup control performed by the in-vehicle backup circuit of Embodiment 1.

For example, when the backup circuit 1 is not performing a backup control shown in FIG. 2, the control unit 30 stops the operations of both the first voltage conversion portion 11 and the second voltage conversion portion 12. Note that the charge voltage of the electricity storage portion 93 is less than or equal to a predetermined first charge voltage while the operations of the first voltage conversion portion 11 and the second voltage conversion portion 12 are stopped.

Figure 3:
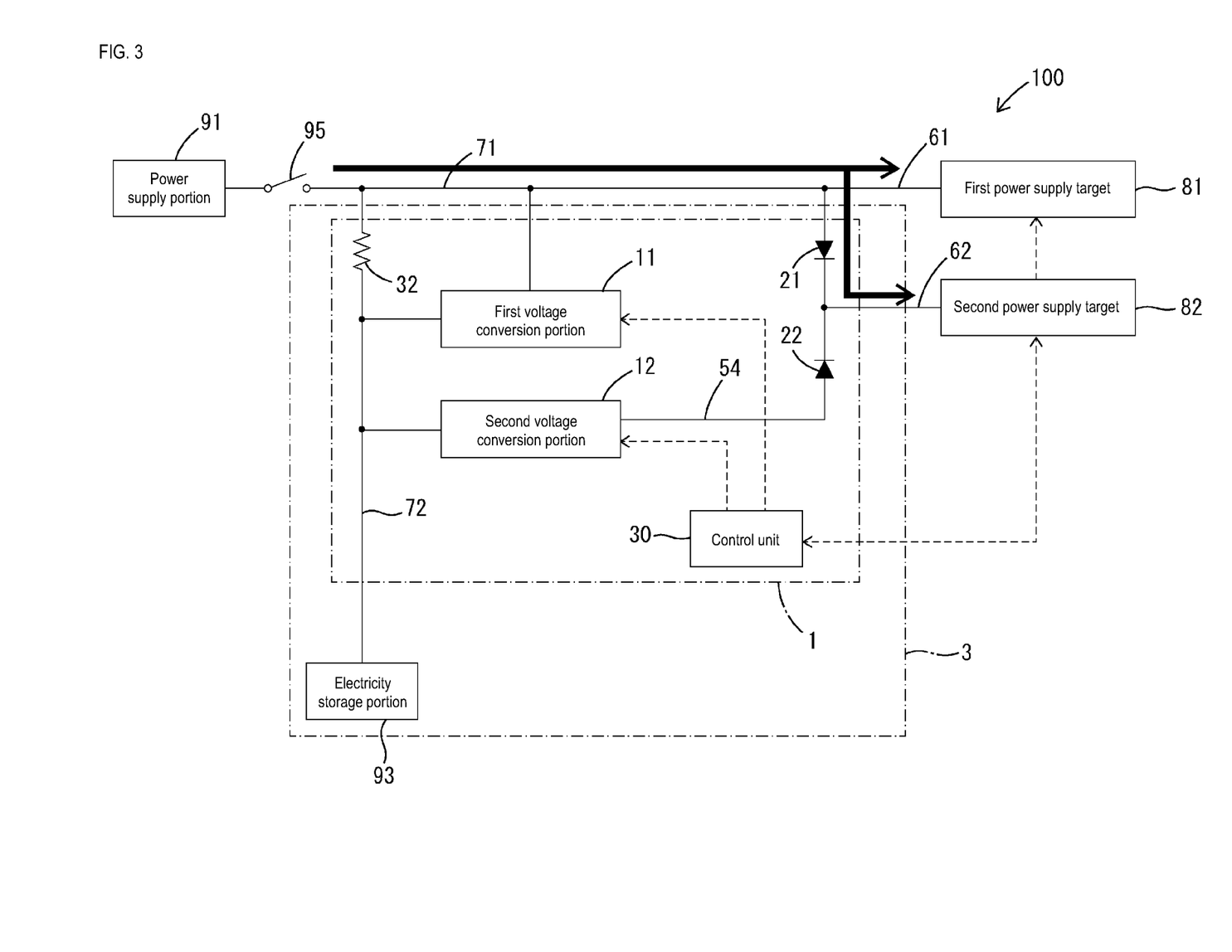
FIG. 3 is an explanatory diagram conceptually illustrating supply of power if the supply of power from a power supply portion is in a predetermined normal state.

If a predetermined charge start condition is satisfied (e.g., if a switch 95 provided along the power supply portion-side conductive path 71 is switched from an OFF state to an ON state) when the control unit 30 is stopping both the first voltage conversion portion 11 and the second voltage conversion portion 12 in this manner, the control unit 30 starts the backup control shown in FIG. 2, starts the above-described first operation by the first voltage conversion portion 11 in step S1, and supplies charge current to the electricity storage portion 93 by the voltage conversion operation of the first voltage conversion portion 11. Note that, when the supply of power of the power supply portion 91 is in the normal state as shown in FIG. 3 immediately after the switch 95 has been switched to an ON state, i.e., the power from the power supply portion 91 is supplied to the first power supply target 81 and the second power supply target 82, then the supply of power as shown in shown in FIG. 3 is continued until a predetermined end condition is satisfied (e.g., until the switch 95 is switched to an OFF state).

After step S1, the control unit 30 determines whether or not a predetermined charge stop condition is satisfied (e.g., whether or not the charge voltage of the electricity storage portion 93 has reached a predetermined second charge voltage that is higher than the above-described first charge voltage), and, if the charge stop condition is satisfied, stops the voltage conversion operation (first operation) of the first voltage conversion portion 11 in step S3.

After stopping the operation of the first voltage conversion portion 11 in step S3, the control unit 30 starts the voltage conversion operation of the second voltage conversion portion 12 in step S4. In the example shown in FIG. 2, stopping the operation of the first voltage conversion portion 11 in step S3 corresponds to "satisfaction of a predetermined first backup condition". In response to the first backup condition being satisfied in this manner, the control unit 30 causes the second voltage conversion portion 12 to start the voltage conversion operation in step S4. If the control unit 30 starts the voltage conversion operation of the second voltage conversion portion 12 in step S4, the control unit 30 controls the voltage conversion operation (step-up operation of stepping up the DC voltage applied to the electricity storage portion-side conductive path 72 and applying the stepped up DC voltage to the intermediate conductive path 54) of the second voltage conversion portion 12 so as to apply a predetermined voltage to the intermediate conductive path 54. The "predetermined voltage" serving as the target value when the second voltage conversion portion 12 is performing the voltage conversion operation is a voltage lower than the voltage applied to the power supply portion-side conductive path 71 when the power supply portion 91 is in a fully charged state and in a normal state (if the voltage of the power supply portion-side conductive path 71 is greater than or equal to a predetermined threshold). Also, when the control unit 30 is causing the second voltage conversion portion 12 to perform the voltage conversion operation in this manner, the power supply portion-side conductive path 71 and the electricity storage portion-side conductive path 72 are electrically connected to each other via the resistive portion 32. Accordingly, if the charge voltage of the electricity storage portion 93 is lower than the charge voltage of the power supply portion 91, charge current is supplied little by little from the power supply portion 91 to the electricity storage portion 93 via the resistive portion 32.

After starting the operation of the second voltage conversion portion 12 in step S4, the control unit 30 determines, in step S5, whether or not instruction information has been acquired.

In the power supply system 100, the second power supply target 82 is configured to output predetermined instruction information to the control unit 30 if the supply of power to the first power supply target 81 has been brought into a stopped state. For example, the second power supply target 82 monitors the voltage (potential) of the first load-side conductive path 61 when the switch 95 is in an ON state, and is configured to output predetermined instruction information to the control unit 30 if the voltage (potential) of the first load-side conductive path 61 has decreased to be less than a given value, and not to output the instruction information to the control unit 30 if the voltage (potential) of the first load-side conductive path 61 is greater than or equal to the given value.

During a period from the start of the voltage conversion operation of the second voltage conversion portion 12 in step S4 until the determination result in step S5 or S6 becomes Yes (i.e., until a predetermined operation stop condition is satisfied, or the instruction information is acquired), the control unit 30 monitors the instruction information while causing the second voltage conversion portion 12 to perform the voltage conversion operation, and causes the first voltage conversion portion 11 to start the second operation in step S7, if the instruction information is acquired from the second power supply target 82 when the control unit 30 is causing the second voltage conversion portion 12 to perform the voltage conversion operation.

Figure 4:
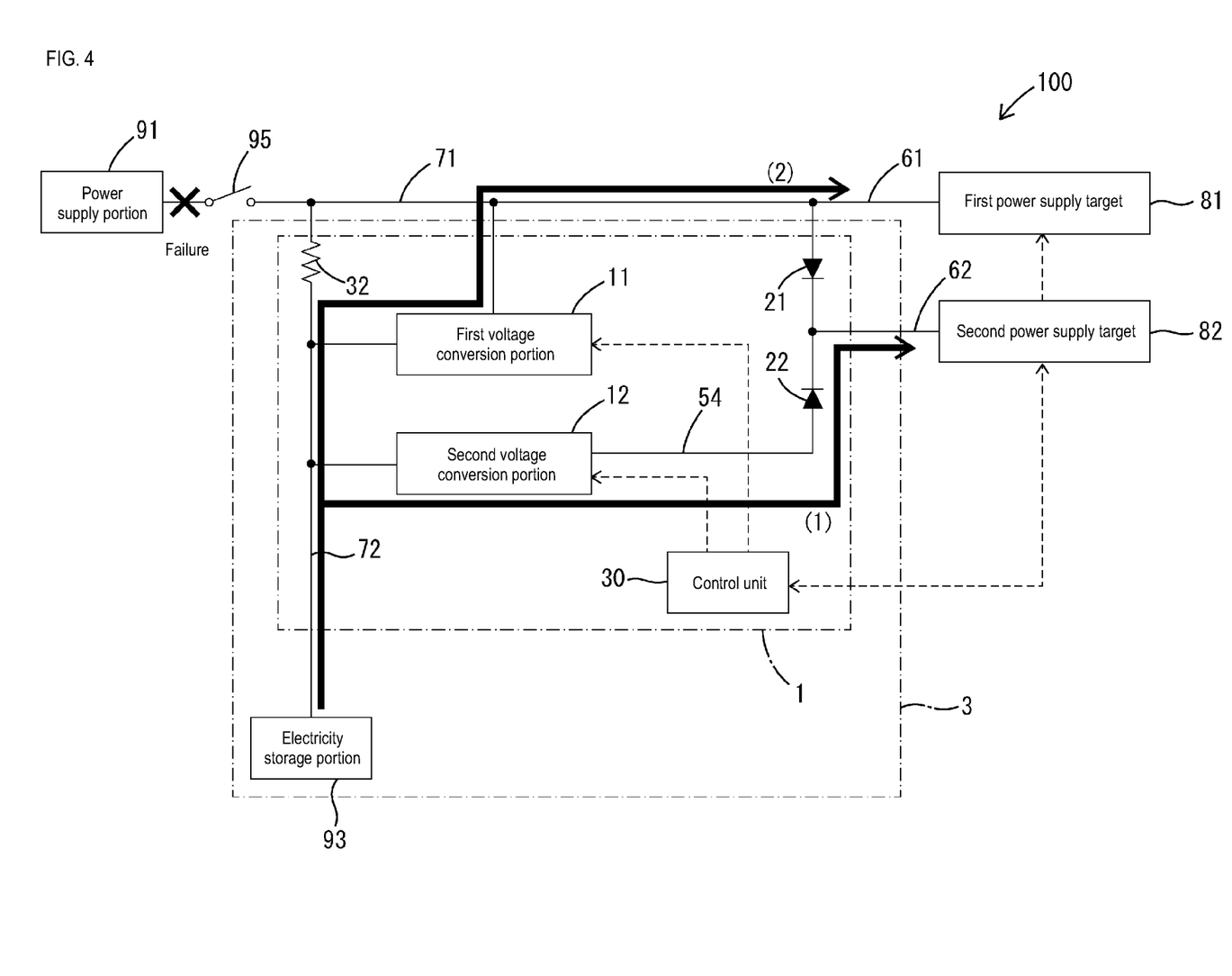
FIG. 4 is an explanatory diagram conceptually illustrating supply of power (backup operation) if the supply of power from the power supply portion is not in the predetermined normal state.

As described above, in the power supply system 100, if the supply of power from the power supply portion 91 is in the normal state when the switch 95 is in the ON state, the supply of power to the first power supply target 81 and the second power supply target 82 is continued as shown in FIG. 3. However, if the supply of power from the power supply portion 91 has been significantly reduced or stopped (e.g., if the breaking of a wire or a ground fault has occurred in the power supply portion-side conductive path 71 as shown in FIG. 4), the supply of power via the power supply portion-side conductive path 71 is rapidly reduced or stopped, and the voltage of the first load-side conductive path 61 also decreases. Then, if the voltage of the first load-side conductive path 61 has decreased to be less than or equal to a predetermined value, the instruction information is transmitted from the second power supply target 82 to the control unit 30 in response to this, and the control unit 30 causes the first voltage conversion portion 11 to perform the second operation according to this instruction information. Note that "predetermined value" here is a value lower than the above-described "predetermined voltage" applied to the intermediate conductive path 54, and is a value larger than 0. The supply of power via the power supply portion-side conductive path 71 is reduced or stopped during a period from when the voltage of the first load-side conductive path 61 has decreased to be less than or equal to a predetermined value until when a sufficient voltage is supplied by the second operation of the first voltage conversion portion 11. However, as indicated by the arrow (1) in FIG. 4, power is instantly supplied via the intermediate conductive path 54 immediately after the voltage of the first load-side conductive path 61 has decreased to be less than or equal to a predetermined value, and therefore the supply of power to the second voltage conversion portion 12 will not be interrupted. Thus, after instantly performing the supply of power via the path indicated by the arrow (1), supply of power is also started via the path indicated by the arrow (2) in FIG. 4 without a significant time interval, and therefore the supply of power to the first power supply target 81 can also be performed promptly. Note that, in this example, the control unit 30 having acquired the instruction information from the second power supply target 82 corresponds to "that a predetermined second backup condition is satisfied", and the control unit 30 is configured to cause the first voltage conversion portion 11 to perform the second operation in response to "that a predetermined second backup condition is satisfied" when the control unit 30 is causing the second voltage conversion portion 12 to perform the voltage conversion operation.

On the other hand, if the predetermined operation stop condition is satisfied without the control unit 30 acquiring the instruction information after causing the second voltage conversion portion 12 to start the voltage conversion operation in step S4, the control unit 30 stops the voltage conversion operation of the second voltage conversion portion 12 in step S8, and discharges the electricity storage portion 93 in step S9 until the charge voltage of the electricity storage portion 93 becomes the above-described first charge voltage. The predetermined operation stop condition may be "the switch 95 having been switched from an ON state to an OFF state", for example. Note that after the discharging operation has been performed in step S9, both the first voltage conversion portion 11 and the second voltage conversion portion 12 are in the stopped state.

The effects of the backup circuit 1 will now be illustrated.

In the in-vehicle power supply system 100 to which the above-described backup circuit 1 is applied, the power from the power supply portion 91 is supplied to the first power supply target 81 and the second power supply target 82 when the supply of power performed from the power supply portion 91 via the power supply portion-side conductive path 71 is in a predetermined normal state. On the other hand, even if the supply of power from the power supply portion 91 ceases for some reason, power can be instantly supplied from the intermediate conductive path 54 to the second load-side conductive path 62 based on the supply of power from the electricity storage portion 93 as long as the second voltage conversion portion 12 is performing the voltage conversion operation in the backup circuit 1, and it is therefore possible to instantly backup the second load-side conductive path 62.

Moreover, the above-described backup circuit 1 can quickly charge the electricity storage portion 93 by the first operation of the first voltage conversion portion 11 during a predetermined period, and the power supply portion-side conductive path 71 and the electricity storage portion-side conductive path 72 are configured to be electrically connected to each other via the resistive portion 32 when the second voltage conversion portion 12 is performing the voltage conversion operation. Accordingly, even if internal consumption or self discharge occurs, charge current can be supplied to the electricity storage portion 93 via the resistive portion 32, thus making it possible to suppress a reduction in the charge voltage of the electricity storage portion 93. Therefore, the charge voltage of the electricity storage portion 93 can be maintained at a higher level when the second voltage conversion portion 12 is performing the voltage conversion operation, thus making it possible to more easily avoid a situation where the charge voltage of the electricity storage portion 93 becomes insufficient when the supply of power from the power supply portion 91 ceases.

Furthermore, the control unit 30 causes the first voltage conversion portion 11 to perform the second operation if a predetermined second backup condition is satisfied when the control unit 30 is causing the second voltage conversion portion 12 to perform the voltage conversion operation, and it is therefore possible to supply the power based on the supply of power from the electricity storage portion 93 also to the first power supply target 81. That is, when the supply of power of the power supply portion 91 ceases, it is possible to perform a backup operation in a manner in which the order of priority is defined so as to instantly supply power to the second power supply target 82, and to supply power to the first power supply target 81 in response to the satisfaction of the second backup condition.

Furthermore, the backup circuit 1 is configured to be brought into the second state if a predetermined voltage is applied to the intermediate conductive path 54 when the power supply portion 91 is in a fully charged state and is in the normal state, and the control unit 30 is configured to cause the second voltage conversion portion 12 to perform the voltage conversion operation so as to apply the predetermined voltage to the intermediate conductive path 54. In the backup circuit 1 configured in this manner, current does not flow from the intermediate conductive path 54 to the second load-side conductive path 62 even if the second voltage conversion portion 12 performs the voltage conversion operation when the power supply portion 91 is in a fully charged state, and it is therefore possible to suppress power consumption during the voltage conversion operation performed by the second voltage conversion portion 12. Also, while continuing preparation with the power consumption suppressed in this manner, it is possible to instantly supply power to the intermediate conductive path 54 when the supply of power from the power supply portion 91 ceases.

The backup circuit 1 includes a first diode 21 having an anode electrically connected to the power supply portion-side conductive path 71 and the first load-side conductive path 61, and a cathode electrically connected to the second load-side conductive path 62, and a second diode 22 having an anode electrically connected to the intermediate conductive path 54, and a cathode electrically connected to the second load-side conductive path 62. Also, the second diode 22 is configured as the element portion. In the backup circuit 1 configured in this manner, current is instantly supplied from the second diode 22 if the voltage of the second load-side conductive path 62 has changed from a state of being higher than a given value (a value obtained by subtracting an amount of voltage dropped in the second diode 22 from a predetermined voltage targeted by the second voltage conversion portion 12) to a state of being lower than the given value, thus enabling a backup operation with a higher degree of seamlessness to be performed with a simple configuration. Furthermore, since the first diode 21 is interposed between the second load-side conductive path 62 and the power supply portion-side conductive path 71, it is possible to prevent current from flowing from the second load-side conductive path 62 into the power supply portion-side conductive path 71 if the voltage of the power supply portion-side conductive path 71 has rapidly decreased as a result of occurrence of a ground fault or the like in the power supply portion-side conductive path 71, thus preventing the voltage of the second load-side conductive path 62 from decreasing during a backup performed via the second diode 22. Accordingly, the second power supply target 82 can be backed up further stably.

Furthermore, the backup circuit 1 can pass a larger charge current by the first voltage conversion portion 11, which has a large power capacity, when charging the electricity storage portion 93 by the first voltage conversion portion 11, thereby quickly increasing the charge voltage, and can efficiently perform preparation by continuing the operation of the second voltage conversion portion 12, which has a relatively low power capacity, when preparing for a power supply failure by operating the second voltage conversion portion 12.

In the in-vehicle power supply system 100 to which the backup circuit 1 is applied, the supply of power to the first power supply target 81 is brought into a stopped state when the supply of power from the power supply portion 91 ceases, and the second power supply target 82 is operated so as to output predetermined instruction information according to this stopped state. On the other hand, if the control unit 30 of the backup circuit 1 acquires the instruction information from the second power supply target 82 when the control unit 30 is causing the second voltage conversion portion 12 to perform the voltage conversion operation, the control unit 30 operates so as to cause the first voltage conversion portion 11 to perform the second operation. Due to such a configuration, it is possible to promptly detect the state of the power supply portion 91 if the supply of power therefrom ceases, and supply the power based on the supply of power from the electricity storage portion 93 also to the first power supply target 81.

Moreover, even if the supply of power from the power supply portion 91 ceases, a backup operation with a higher degree of seamlessness can be instantly performed on the second power supply target 82. Accordingly, it is possible to prevent a situation where a lack of power to the second power supply target 82 makes it impossible to detect "that the supply of power to the first power supply target 81 has been brought into a stopped state", and therefore a trigger for starting the second operation can be more reliably provided to the control unit 30. Thus, even if the supply of power from the power supply portion 91 ceases, the supply of power using the first voltage conversion portion 11 can be more easily started for the first power supply target 81 more promptly and more reliably.

Other Embodiments

The present disclosure is not limited to the embodiment described by the above statements and drawings, and, for example, the following embodiments also fall within the technical scope of the present disclosure.

In Embodiment 1, a lead-acid battery is used as the power supply portion 91; however, the present disclosure is not limited to this configuration. In any of the examples in the present specification, another power supply means (another known electricity storage means, power generating means, etc.) may be used as the power supply portion 91 in place of, or in combination with a lead-acid battery. The number of power supply means constituting the power supply portion 91 is not limited to one, and the power supply portion 91 may be constituted by a plurality of power supply means.

In Embodiment 1, an electric double layer capacitor (EDLC) is used as the electricity storage portion 93; however, the present disclosure is not limited to this configuration. In any of the examples in the present specification, another electricity storage means such as a lithium ion battery, a lithium ion capacitor, a nickel-metal hydride rechargeable battery may be used as the electricity storage portion 93. The number of electricity storage means constituting the electricity storage portion 93 is not limited to one, and the electricity storage portion 93 may be constituted by a plurality of electricity storage means.

In Embodiment 1, a configuration is illustrated in which the charge voltage of the electricity storage portion 93 is lower than the charge voltage of the power supply portion 91; however, the charge voltage of the electricity storage portion 93 may be about the same as the charge voltage of the power supply portion 91, or the charge voltage of the electricity storage portion 93 may be higher than the charge voltage of the power supply portion 91. In a configuration in which the charge voltage of the electricity storage portion 93 is higher than the charge voltage of the power supply portion 91, the first voltage conversion portion 11 may perform the first operation so as to step up the voltage applied to the power supply portion-side conductive path 71 to apply an output voltage to the electricity storage portion-side conductive path 72, and may perform the second operation so as to step down the voltage applied to the electricity storage portion-side conductive path 72 to apply an output voltage to the power supply portion-side conductive path 71. The second voltage conversion portion 12 may perform the voltage conversion operation so as to step down the voltage applied to the electricity storage portion-side conductive path 72, and to apply the stepped-down voltage to the intermediate conductive path 54.

In Embodiment 1, the control unit 30 having acquired instruction information from the second power supply target 82 corresponds to "a predetermined second backup condition is satisfied"; however, the control unit 30 may monitor the voltage of the power supply portion-side conductive path 71, and "the control unit 30 having detected that the voltage of the power supply portion-side conductive path 71 has decreased to be less than or equal to a predetermined value" may correspond to that "a predetermined second backup condition is satisfied".

In Embodiment 1, the switch 95 having been switched from an OFF state to an ON state corresponds to "satisfaction of a predetermined charge start condition"; however, for example, the charge voltage of the electricity storage portion 93 having decreased to be less than or equal to a predetermined charge voltage may correspond to "satisfaction of a predetermined charge start condition", and the control shown in FIG. 2 may be started accordingly.

In Embodiment 1, the operation of the first voltage conversion portion 11 having been stopped in step S3 corresponds to "satisfaction of a predetermined first backup condition"; however, the charge voltage of the electricity storage portion 93 having reached a predetermined charge voltage (e.g., a value lower than the charge voltage of the electricity storage portion 93 in a fully charged state) during the first operation of the first voltage conversion portion 11 may correspond to "satisfaction of a predetermined first backup condition".

In Embodiment 1, the charge voltage of the electricity storage portion 93 having reached a second charge voltage corresponds to "satisfaction of a charge stop condition"; however, the charge current flowing through the electricity storage portion-side conductive path 72 having decreased to be less than or equal to a predetermined current value may correspond to "satisfaction of a charge stop condition".

Although there is no specific limitation with respect to the switch 95 in Embodiment 1, the switch 95 may be a vehicle starting switch (ignition switch, etc.), a switch that is turned on/off in conjunction with a vehicle starting switch, or a switch different from a starting switch.

The invention claimed is:

1. An in-vehicle backup circuit for use in an in-vehicle power supply system including:
    a power supply portion-side conductive path serving as a path to which power is supplied from a power supply portion;
    a first load-side conductive path serving as a path for supplying power to a first power supply target;
    a second load-side conductive path serving as a path for supplying power to a second power supply target; and
    an electricity storage portion serving as a power supply source different from the power supply portion,
    wherein, when supply of power performed from the power supply portion via the power supply portion-side conductive path is in a predetermined normal state, power is supplied to the first power supply target from the power supply portion via the power supply portion-side conductive path and the first load-side conductive path, and power is supplied to the second power supply target from the power supply portion via the power supply portion-side conductive path and the second load-side conductive path, the in-vehicle backup circuit comprising:
    an electricity storage portion-side conductive path electrically connected to the electricity storage portion;
    a predetermined intermediate conductive path;
    a first voltage conversion portion configured to perform a first operation of stepping down or stepping up a voltage applied to the power supply portion-side conductive path to apply an output voltage to the electricity storage portion-side conductive path, and a second operation of stepping down or stepping up a voltage applied to the electricity storage portion-side conductive path to apply an output voltage to the power supply portion-side conductive path;
    a resistive portion provided in parallel with the first voltage conversion portion between the power supply portion-side conductive path and the electricity storage portion-side conductive path;
    a second voltage conversion portion configured to perform a voltage conversion operation of stepping up or stepping down a voltage applied to the electricity storage portion-side conductive path to apply an output voltage to the intermediate conductive path;
    an element portion that is provided between the intermediate conductive path and the second load-side conductive path, and is configured to allow flow of current from the intermediate conductive path to the second load-side conductive path when the backup circuit is in a first state in which a potential of the intermediate conductive path is higher than a potential of the second load-side conductive path by a predetermined potential difference or more, and to limit flow of current from the intermediate conductive path to the second load-side conductive path when the backup circuit is in a second state in which the first state has been cancelled; and
    a control unit configured to control operations of the first voltage conversion portion and the second voltage conversion portion,
    wherein the control unit is configured to:
    cause the first voltage conversion portion to start the first operation in response to satisfaction of a predetermined charge start condition, and to stop the first operation in response to a predetermined charge stop condition having been satisfied during the first operation;
    cause the second voltage conversion portion to perform the voltage conversion operation in response to satisfaction of a predetermined first backup condition; and
    cause the first voltage conversion portion to perform the second operation in response to a predetermined second backup condition having been satisfied when the control unit is causing the second voltage conversion portion to perform the voltage conversion operation, and
    the power supply portion-side conductive path and the electricity storage portion-side conductive path are configured to be electrically connected via the resistive portion when the control unit is causing the second voltage conversion portion to perform the voltage conversion operation.

2. The in-vehicle backup circuit according to claim 1,
    wherein the backup circuit is configured to be brought into the second state if a predetermined voltage is applied to the intermediate conductive path when the power supply portion is in a fully charged state and is in the normal state, and
    the control unit causes the second voltage conversion portion to perform the voltage conversion operation so as to apply the predetermined voltage to the intermediate conductive path.

3. The in-vehicle backup circuit according to claim 1, comprising:
    a first diode having an anode electrically connected to the power supply portion-side conductive path and the first load-side conductive path, and a cathode electrically connected to the second load-side conductive path; and
    a second diode having an anode electrically connected to the intermediate conductive path, and a cathode electrically connected to the second load-side conductive path, wherein the second diode is configured as the element portion.

4. The in-vehicle backup circuit according to claim 1, wherein the second voltage conversion portion is a voltage conversion portion having a smaller power capacity than the first voltage conversion portion.

5. The in-vehicle backup circuit according to claim 1, wherein the second power supply target is configured to output predetermined instruction information if supply of power to the first power supply target has been brought into a stopped state, and
the control unit causes the first voltage conversion portion to perform the second operation, using, as the satisfaction of the second backup condition, the instruction information having been output from the second power supply target when the control unit is causing the second voltage conversion portion to perform the voltage conversion operation.

6. An in-vehicle backup device comprising:
the in-vehicle backup circuit according to claim 1; and
the electricity storage portion.

7. The in-vehicle backup circuit according to claim 2, comprising:
a first diode having an anode electrically connected to the power supply portion-side conductive path and the first load-side conductive path, and a cathode electrically connected to the second load-side conductive path; and
a second diode having an anode electrically connected to the intermediate conductive path, and a cathode electrically connected to the second load-side conductive path,
wherein the second diode is configured as the element portion.

8. The in-vehicle backup circuit according to claim 2, wherein the second voltage conversion portion is a voltage conversion portion having a smaller power capacity than the first voltage conversion portion.

9. The in-vehicle backup circuit according to claim 3, wherein the second voltage conversion portion is a voltage conversion portion having a smaller power capacity than the first voltage conversion portion.

10. The in-vehicle backup circuit according to claim 2, wherein the second power supply target is configured to output predetermined instruction information if supply of power to the first power supply target has been brought into a stopped state, and
the control unit causes the first voltage conversion portion to perform the second operation, using, as the satisfaction of the second backup condition, the instruction information having been output from the second power supply target when the control unit is causing the second voltage conversion portion to perform the voltage conversion operation.

11. The in-vehicle backup circuit according to claim 3, wherein the second power supply target is configured to output predetermined instruction information if supply of power to the first power supply target has been brought into a stopped state, and
the control unit causes the first voltage conversion portion to perform the second operation, using, as the satisfaction of the second backup condition, the instruction information having been output from the second power supply target when the control unit is causing the second voltage conversion portion to perform the voltage conversion operation.

12. The in-vehicle backup circuit according to claim 4, wherein the second power supply target is configured to output predetermined instruction information if supply of power to the first power supply target has been brought into a stopped state, and
the control unit causes the first voltage conversion portion to perform the second operation, using, as the satisfaction of the second backup condition, the instruction information having been output from the second power supply target when the control unit is causing the second voltage conversion portion to perform the voltage conversion operation.

13. The in-vehicle backup device according to claim 6, wherein the backup circuit is configured to be brought into the second state if a predetermined voltage is applied to the intermediate conductive path when the power supply portion is in a fully charged state and is in the normal state, and
the control unit causes the second voltage conversion portion to perform the voltage conversion operation so as to apply the predetermined voltage to the intermediate conductive path.

14. The in-vehicle backup device according to claim 6, further comprising:
a first diode having an anode electrically connected to the power supply portion-side conductive path and the first load-side conductive path, and a cathode electrically connected to the second load-side conductive path; and
a second diode having an anode electrically connected to the intermediate conductive path, and a cathode electrically connected to the second load-side conductive path,
wherein the second diode is configured as the element portion.

15. The in-vehicle backup device according to claim 6, wherein the second voltage conversion portion is a voltage conversion portion having a smaller power capacity than the first voltage conversion portion.

16. The in-vehicle backup device according to claim 6, wherein the second power supply target is configured to output predetermined instruction information if supply of power to the first power supply target has been brought into a stopped state, and
the control unit causes the first voltage conversion portion to perform the second operation, using, as the satisfaction of the second backup condition, the instruction information having been output from the second power supply target when the control unit is causing the second voltage conversion portion to perform the voltage conversion operation.

* * * * *